United States Patent

[11] 3,617,588

[72] Inventor Cyril A. J. Langman
 Midland, Mich.
[21] Appl. No. 833,715
[22] Filed June 16, 1969
[45] Patented Nov. 2, 1971
[73] Assignee The Dow Chemical Company
 Midland, Mich.

[54] DIP-COATING PROCESS FOR PREPARING CELLULOSE ETHER CAPSULE SHELLS
6 Claims, No Drawings

[52] U.S. Cl. .................................................... 264/25,
 106/197, 117/93.2, 264/301, 264/DIG. 37,
 264/DIG. 46
[51] Int. Cl. .......................................................... B29c 13/00
[50] Field of Search ........................................... 264/301,
 25, DIG. 41, DIG. 1, DIG. 37; 106/197; 117/93.2,
 62.2, 115

[56] References Cited
 UNITED STATES PATENTS
3,315,016 4/1967 Wersosky et al. ............... 264/25
3,493,407 2/1970 Greminger et al. ............ 264/301
 FOREIGN PATENTS
1,010,389 1965 Great Britain ................. 264/301

Primary Examiner—Robert F. White
Assistant Examiner—Gene Auville
Attorneys—Griswold & Burdick and D. B. Kellom ABSTRACT: The dip-coating process for preparing cellulose ether film products is improved by (A) dipping a die mandrel with an electrically conductive outer surface into an aqueous thermal gelling solution containing at least 20 wt. percent of a film-forming hydroxyalkyl alkyl cellulose ether, (B) removing the coated die mandrel from the aqueous solution, (C) rapidly converting the coating into a nonflowing cellulose ether gel by induction heating, and thereafter (D) drying the gelled coating to form a stable film product. This process is particularly useful in making water-soluble, pharmaceutical capsule shells.

3,617,588

DIP-COATING PROCESS FOR PREPARING CELLULOSE ETHER CAPSULE SHELLS

BACKGROUND

Pharmaceutical capsule shells have long been made of gelatin in spite of the recognized deficiencies of gelatin shells at very low or high humidity. No other material has yet met the rigid requirements for commercial acceptance.

Water-soluble, film-forming cellulose ethers have been suggested. Thus in U.S. Pat. No. 2,526,683 Murphy describes the preparation of methylcellulose capsules by a process involving thermal gelation of an aqueous cellulose ether solution on a preheated capsule forming pin. Greminger and Weaver in U.S. Pat. No. 2,810,659 describe plasticized cellulose ether compositions suitable for molding or extruding into flexible films and capsules. However, mechanical problems and poor capsule properties have prevented commercial use of these processes.

STATEMENT OF THE INVENTION

An improved dip-coating process has now been discovered in which elimination of thermal gelation in the coating bath, use of certain low-viscosity hydroxyalkyl cellulose ethers, and rapid immobilization of the dip coating by induction heating after removal from the coating bath are critical elements. More specifically, the improved process comprises: (A) dipping a die mandrel having an electrically conductive outer surface and a surface temperature below the gel point temperature of the coating solution into an aqueous thermal gelling coating solution having a viscosity of about 1,000–12,000 cps. and containing at least 20 wt. percent of a film-forming $C_2$–$C_4$ hydroxyalkyl $C_1$–$C_2$ alkyl cellulose ether characterized by a hydroxyalkyl M.S. of about 0.07–1.0, an alkyl D.S. of about 0.6–2.0, and a viscosity of about 2–20 cps. as a 2 wt. percent aqueous solution at 20° C.; (B) removing the coated die mandrel from the aqueous coating solution; (C) rapidly converting the cellulose ether coating into a nonflowing gel by induction heating; and thereafter (D) drying the gelled coating to form a stable cellulose ether film product.

By preventing thermal gelation in the dip-coating bath, a more uniform, clean-breaking, coating of the die mandrel is obtained. But once removed from the bath, the cellulose ether coating is rapidly gelled by induction heating to provide a stable, nonflowing and uniform coating. Final drying provides a hard and strong cellulose ether film product quite suitable for pharmaceutical applications. These products have good film clarity and rate of dissolution, yet they remain firm and sturdy under conditions of extreme humidity.

GENERAL DESCRIPTION—DIP-COATING BATH

Murphy, U.S. PAt. No. 2,526,683 describes the general requirements for an aqueous dip-coating bath of a thermal gelling cellulose ether. To obtain a dry film thickness of about 4–5 mils in a single dip operation, the bath must contain at least 20 wt. percent of the cellulose ether and have an operational viscosity of about 1,000–12,000 cps. This requires a water-soluble cellulose ether with a standard 2 percent aqueous solution viscosity of about 2–20 cps., preferably about 2–7 cps. Particularly effective is a bath having a viscosity of about 1,000–4,000 cps. at a dip-coating temperature of about 25°–35° C.

Typical of the water-soluble, film-forming cellulose ethers used herein are hydroxypropyl methyl cellulose, hydroxybutyl methyl cellulose, and hydroxyethyl ethyl cellulose. Particularly suitable are cellulose ethers having a $C_2$–$C_4$ hydroxyalkyl M.S. of about 0.7–1.0 and a $C_1$–$C_2$ alkyl D.S. of about 0.6–2.0. Most desirable for pharmaceutical applications because of film clarity and water solubility are cellulose ethers having a hydroxypropyl M.S. of about 0.15–0.35 and a methyl D.S. of about 1.8–2.0. The terms M.S. (molar substitution) and D.S. (degree of substitution) are used as defined in Klug U.S. Pat. No. 3,357,971.

These thermal gelling hydroxyalkyl alkyl cellulose ethers normally have an aqueous 2 percent solution gel point of about 45°–90° C. as determined from a standard temperature-viscosity curve. [Cf. A. B. Savage, Ind. and Eng. Chem. 4999 (1957). The more concentrated aqueous solutions used in the present process have gel points normally about 10°–20° lower than the 2 percent solutions. Stiff, immobilized and nonflowing gels are obtained when the concentrated aqueous solution is heated to a few degrees above its gel point. For example, a hydroxypropyl methyl cellulose with a 2 percent solution gel point of about 60° C., as a 25 percent solution has a gel point of about 42° C. and forms a firm nonflowing gel at 45°–46° C. Further control of the dip-coating solution gel point can be obtained using conventional cellulose ether gelation additives such as NaCl, $Na_2SO_4$, $Na_2CO_3$, $Na_3PO_4$, $MgCl_2$, $Al_2(SO_4)_3$, urea, etc.

Normally the temperature of the dip-coating bath is held about 5°–10° C. below its gel point temperature. Under these conditions effective dip coating is obtained by immersing a die mandrel having a surface temperature below the thermal gel point of the bath into the bath and then smoothly removing the coated die from the bath allowing the excess coating solution to drain from the die as it separates from the bath.

A critical element in the present process is the rapid immobilization of the cellulose ether coating after removal from the dip-coating bath. Unless the coating is rapidly immobilized on the die surface, the coating uniformity will be lost with formation of flow bulges or tires. Particularly in preparing pharmaceutical capsule shells, extreme coating uniformity is required.

Attempts to immobilize the coating by conventional heating methods using preheated air, infrared heaters, dielectric heaters, electric resistance heaters, all failed to provide the requisite rapid, direct and flexible heating required for a commercial dip coating operation. However, induction heating was found to be highly effective giving gelation and immobilization of the coating in a few seconds.

Induction heating uses a skin-effect phenomena observed when an electroconductive object is placed within an electromagnetic field formed by the flow of rapidly alternating current in a coil. As applied to the dip-coating process, the coated die mandrel immediately after removal from the cellulose ether bath passes into an induction heater unit. The electric currents induced in the die mandrel heat its surface and rapidly raises the temperature of the aqueous cellulose ether coating above its gel point. Thus the coating is effectively and rapidly immobilized. Thereafter further drying of the gelled coating can be carried out by any desired method without distortion of the coating film, a critical requirements in producing capsule shells.

To permit induction heating, the die mandrel must have an outer surface of an electrically conductive metal such as aluminum, brass, copper, steel or titanium. Magnetic metals are particularly effective since the magnetic permeability generally results in higher induction heating surface temperatures. Particularly suitable in the manufacture of capsule shells are stainless steel pins which can be machined to a close tolerance and mounted on a nonconductive support.

A suitable induction heater comprises a copper coil energized by a single-phase alternating current. In general, a frequency range of about 200–5,000 kilocycles per second, preferably about 250–400 kc./sec. is suitable for rapid gelation of the cellulose ether dip coating. Further details on induction heating of conductive metals are given in Faeknerea U.S. Pat. No. 2,902,572 and Alf U.S. Pat. No. 3,041,434, for example.

Since the induced currents are concentrated near the surface of the die mandrel, it becomes a highly efficient and selective heating source for the thermal gelation of the cellulose ether. A further advantage of the induction heater is that no physical contact is required between the energy source and the object to be heated, thus lending flexibility to the system design and operation.

By appropriate control of the frequency and field strength, effective thermal gelation can be achieved in about 1–30 sec. Thereafter the gelled cellulose ether coating held at a temperature above its gel point can be dried in any convenient manner, such as a hot-air kiln, until a firm, essentially water-free film or coating is obtained. In the production of pharmaceutical capsules, the dried cellulose ether capsule shells are removed from the die mandrel, trimmed and assembled.

Normally the cellulose ether films or coatings are relatively clear and transparent. However, if opaque capsules are desired, a minor amount of inert nontoxic pigment such as powdered charcoal or finely divided titanium dioxide can be incorporated in the coating composition. Conventional nontoxic dyes and fillers can also be used. For increased flexibility, an appropriate plasticizer such as glycerine, propylene glycol, or hydroxypropyl glycerine can be included in a moderate amount, e.g., 5 to 20 percent.

This process is particularly suited for preparing pharmaceutical capsule shells which dissolve at a rate comparable to gelatin capsules. Delay release characteristics can be obtained by incorporation of a less water-soluble cellulose ether such as ethyl cellulose as described by Greminger and Windover U.S. Pat. No. 2,887,440.

To illustrate further the present invention, the following examples are given. Unless otherwise specified, all parts and percentages are by weight. Solution viscosities are determined by the method of ASTM D–1347–64 unless otherwise stated.

EXAMPLE 1

A. An aqueous dip-coating solution was prepared by dissolving 250 parts of hydroxypropyl methyl cellulose in 750 parts water at room temperature. The hydroxypropyl methyl cellulose used had a 2 percent aqueous solution viscosity of 5 cps. at 20° C. and a thermal gel point of about 60° C. Its hydroxypropyl M.S. was about 0.15–0.35 and its methoxyl D.S. about 1.8–2.0. The clear 25 percent aqueous solution had a viscosity of 3,500 cps. at 25° C. measured at a shear rate of 30 sec.$^{11}$ on a Haake Rotovisco viscometer. Its gel point was about 41°–2° C. with a firm, rigid gel being obtained at 43°–45° C.

B. Capsule shells were prepared from this aqueous cellulose ether solution using No. 0 capsule pins machined from Type 313 stainless steel and lightly coated with a cotton seed oil lubricant grease. The pins, mounted on a nonelectrically conducting bar, were dipped into the cellulose ether solution at room temperature for 10–15 seconds. Then they were smoothly withdrawn from the solution allowing the excess to strip from the coated pin.

The coated pins were then immediately inverted and placed in a 5 kw. induction heater coil about 15 cm. long and 10 cm. in diameter and consisting of 12 turns of 6–8 mm. copper tubing connected to a 450 kilocycle per second alternating current source. In less than 20 seconds, the cellulose ether coating had gelled to an immobile form. Final drying was achieved in a warm-air oven at 50°–60° C.

The resulting capsule shells stripped from the pins had a uniform thickness of about 4 mils with excellent retention of shape. No significant formation of thick rings or "tires" from excessive rundown prior to gelation was observed. The shells were easily assembled into capsules. Their dried equilibrium water content was about 5 wt. percent at room temperature and humidity.

EXAMPLE 2

In another test, the 25 percent aqueous hydroxypropyl methyl cellulose solution described in example 1 was modified by addition of 1.1 wt. percent sodium sulfate to give a solution with a gel point of about 33° C. Capsule shells prepared from this solution turned opaque when gelled by induction heating and remained opaque when dry. Their dried shell thickness and shape were very uniform.

EXAMPLE 3

Further tests with a 5 kilowatt induction heater indicated that with continuous application of power, an immobile gel was obtained in about 5–10 seconds. Other thermal gelling hydroxyalkyl alkyl cellulose ethers applied as 20–40 weight percent aqueous solutions gave similar results when the die mandrels were placed in an induction heater coil after dip coating.

I claim:

1. In a process for preparing ingestible, water-soluble cellulose ether pharmaceutical capsule shells by dip coating a die mandrel with an aqueous, film-forming cellulose ether solution, the improvement which comprises:
    A. Dipping a die mandrel having an electrically conductive outer surface and a surface temperature below the gel point temperature of the coating solution into an aqueous thermal gelling coating solution containing at least 20 wt. percent of a film-forming $C_2$–$C_4$ hydroxyalkyl $C_1$–$C_2$ alkyl cellulose ether, said solution having a viscosity of about 1,000–12,000 cps;
    B Removing the coated die mandrel from the aqueous coating solution and immediately placing it in an induction heating zone;
    C. Rapidly converting the cellulose ether coating into a nonflowing thermal gel by induction heating in a magnetic field generated by an induction heating coil operation at a frequency of about 200–5,000 kilocycles per second; and thereafter
    D. Drying the gelled coating to form a stable, ingestible, water-soluble cellulose ether pharmaceutical capsule shell.

2. The process of claim 1 where the cellulose ether is a hydroxypropylmethyl cellulose having a hydroxypropyl M.S of about 0.15–0.35, a methyl D.S. of about 1.8–2.0, and a 2 percent aqueous solution viscosity of about 2–7 cps. at 20° C.

3. The process of claim 2 where the coating solution contains about 25–35 wt. percent of the hydroxypropylmethyl cellulose and has a viscosity of about 1,000–4,000 cps. at the dip-coating temperature.

4. The process of claim 1 where the die mandrel is made of stainless steel.

5. The process of claim 1 where the induction heater operates at a frequency of about 250–400 kilocycles per second.

6. The process of claim 1 where pharmaceutical capsule shells are prepared by: (A) Dip coating a stainless steel die mandrel with a 25–35 wt. percent aqueous solution of a hydroxypropylmethyl cellulose characterized by a hydroxypropyl M.S. of about 0.15–0.35, a methyl D.S. of about 1.8–2.0, and a 2 percent aqueous solution viscosity of about 2–7 cps. at 20° C. (B) removing the coated die mandrel from the cellulose ether solution and immediately placing it in an induction heating zone; (C) rapidly converting the cellulose ether coating into a nonflowing gel by induction heating in a magnetic field generated by an induction heating oil operating at a frequency of about 200–5,000 kilocycles per second; (D) drying the gelled cellulose ether coating in a hot-air oven; and (E) stripping the capsule shell from the die mandrel.

* * * * *

PO-1050
(5/69)

UNITED STATES PATENT OFFICE
CERTIFICATE OF CORRECTION

Patent No. 3,617,588      Dated 2 Nov. 1971

Inventor(s) Cyril A. J. Langman

It is certified that error appears in the above-identified patent and that said Letters Patent are hereby corrected as shown below:

In column 2, line 4, delete "4999" and insert -- 49 99 --.

In column 3, line 38, delete "sec.$^{11}$" and insert -- sec.$^{-1}$ --.

Signed and sealed this 2nd day of May 1972.

(SEAL)
Attest:

EDWARD M. FLETCHER, JR.
Attesting Officer

ROBERT GOTTSCHALK
Commissioner of Patents